Jan. 12, 1926.
J. A. MOORE
1,568,990
CHILD'S VEHICLE
Filed Dec. 16, 1922
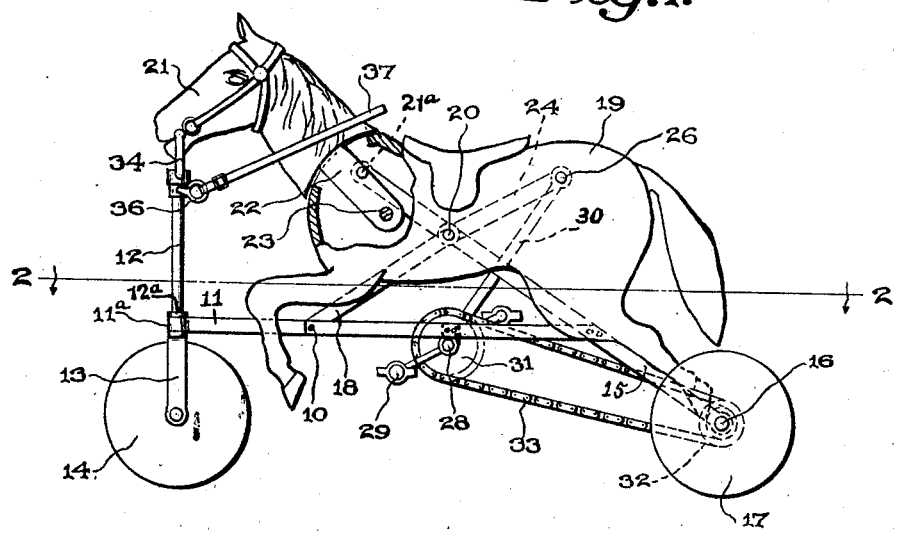
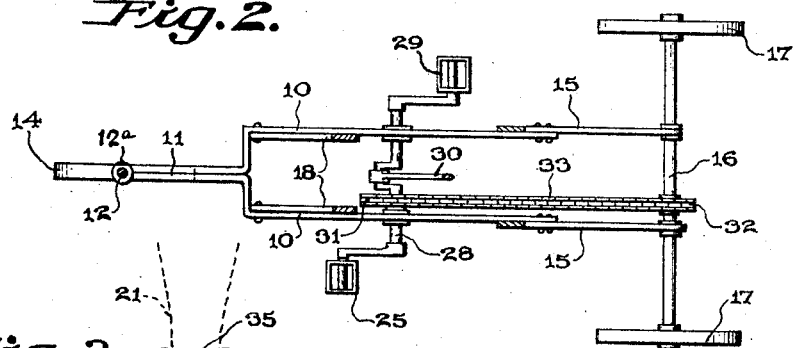
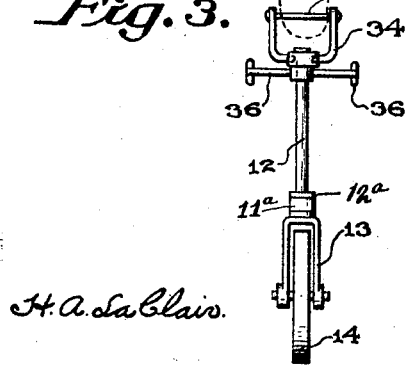
Joseph A. Moore
INVENTOR Patented Jan. 12, 1926.

1,568,990

UNITED STATES PATENT OFFICE.

JOSEPH A. MOORE, OF PALMER, TEXAS, ASSIGNOR OF ONE-HALF TO AMOS L. TICER, OF BOYCE, TEXAS.

CHILD'S VEHICLE.

Application filed December 16, 1922. Serial No. 607,361.

*To all whom it may concern:*

Be it known that I, JOSEPH A. MOORE, a citizen of the United States, residing at Palmer, in the county of Ellis and State of Texas, have invented new and useful Improvements in Children's Vehicles, of which the following is a specification.

This invention relates to children's vehicles and has for an object the provision of a vehicle designed to represent an animal which may be propelled by the rider and which will simultaneously imitate movements of the animal during such propulsion.

More specifically stated, the invention aims to provide a vehicle designed to represent a horse, which, when propelled by the rider will simulate a galloping horse whose head will be simultaneously moved.

To this end, the invention includes a novel form of wheel supported frame, together with novel means for rocking the body and head of the horse pivotally and for guiding the same.

With the above and other objects in view, the invention further includes the following novel features and details of construction, to be hereinafter more fully described, illustrated in the accompanying drawings and pointed out in the appended claims.

In the drawings:—

Figure 1 is a side elevation of a vehicle constructed in accordance with the invention.

Figure 2 is a section taken substantially on the line 2—2 of Figure 1 with the body of the animal removed.

Figure 3 is a fragmentary end view.

Figure 4 is a detail perspective view of the rocker frame.

Referring in detail to the drawings, wherein like characters of reference denote corresponding parts, the frame of the device is shown as comprising parallel side bars 10, which are connected at their forward ends and have extending therefrom a forwardly projecting portion 11 whose outer end is provided with a bearing 11ª for a steering post 12, while the lower end of this steering post has connected thereto spaced arms 13 between which is mounted a wheel or roller 14. The steering post 12 has collars 12ª secured thereto upon opposite sides of the bearing. Connected to the rear ends of the parallel side bars 10 are spaced inclined bars 15, whose rear ends provide bearings for an axle 16 upon which wheels 17 are mounted. The upper inner end of the bars 15 connect with downwardly and forwardly inclined bars 18, whose lower ends are connected to the side bars 10, so that the bars 15 and 18 provide spaced inverted substantially V-shaped frames.

Positioned above and receiving the upper ends of the inverted V-shaped frames is the representation of a horse, whose body 19 is pivotally mounted upon the opposite ends of a bar 20 fixed in the V-frames, so that the horse will be mounted for pivotal movement. The head of the horse which is indicated at 21 is capable of pivotal movement with respect to the body and for this purpose the head has rigidly secured thereto an arm 22 whose inner end is pivotally connected to the body 19 by a pivot 23.

Mounted for pivotal movement upon the bar 20 is a second substantially V-shaped frame which includes parallel side bars 24 having one of their ends connected by a bar 25, whose opposite ends are connected to the sides of the figure as shown at 26. The opposite ends of the bars 24 have extending therethrough pins 27 which are connected to the neck of the figure upon opposite sides of the arm 22 as indicated at 21'.

Extending transversely of the side bars 10 and mounted in suitable bearings is a crank shaft 28, whose opposite ends have secured thereto pedals 29. This crank shaft is connected to the bar 25 by means of a connecting rod 30 pivotally connected to the bar so that when the crank shaft is operated, the body 19 of the animal will be rocked upon the bar 20, while the connection between the bars 24 of the V-shaped frame and the neck of the animal will move the head pivotally with respect to the body.

Mounted upon the crank shaft 28 is a sprocket 31, while a sprocket 32 is mounted upon the axle 16, the said sprockets being connected by a chain 33 so that operation of the crank shaft will drive the axle.

Swiveled to the upper end of the steering post 12 is a yoke 34 whose upper ends are connected by a bar 35 and the latter passes through a slot provided in the head 21 so as to hold the yoke 34 against movement while permitting pivotal movement of the head 21. Extending from opposite sides of and secured to the steering post 12 are arms 36, while connected to the outer ends of each of these arms is a strap or similar element 37 which extends around the neck of the animal so as to provide reins.

It will be seen from the foregoing description and accompanying drawings that the invention provides a toy which may be ridden after the manner of a horse and propelled by means of the pedals 29, the propelling means also serving to rock the body of the horse in imitation of a gallop, while the head of the horse will be simultaneously moved. The steering is effected through the use of the reins 37.

The invention is susceptible of various changes in its form, proportions and minor details of construction and the right is herein reserved to make such changes as properly fall within the scope of the appended claims.

Having described the invention what is claimed is:—

1. A child's vehicle comprising a frame, supporting wheels therefor, a figure of an animal positioned above the frame, a rod extending through the frame and pivotally engaging the figure to support the latter, a pivotal connection between the body and head of the figure, foot operated means including a crank shaft, whereby the vehicle may be propelled, a substantially V-shaped member mounted upon the rod and connected to the body and neck of the figure, means connecting the V-shaped member and crank shaft, whereby the body of the figure may be rocked upon the rod and the head moved relatively when the crank shaft is operated, and guiding means for the vehicle.

2. A child's vehicle comprising a supporting frame including parallel side bars, and inverted substantially V-shaped members connected to the side bars, wheels supporting the frame, a figure of an animal positioned over and receiving the upper ends of the inverted V-shaped members, a rod extending through the upper ends of the V-shaped members and engaging the sides of the figure to pivotally support the latter, a pivotal connection between the body and head of the figure, foot operated means including a crank shaft, whereby the vehicle may be propelled, a substantially V-shaped frame pivotally mounted upon the rod and connected to the body and neck of the figure, means connecting the V-shaped frame and crank shaft, whereby the body may be rocked upon the pivot rod and the head moved relatively when the crank shaft is operated, and guiding means for the vehicle.

In testimony whereof I affix my signature.

JOSEPH A. MOORE.